DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 5, 1975

937 O.G. 12

T937,004

DESALINATION EMPLOYING LIQUEFIED NATURAL GAS AND SECONDARY REFRIGERANT

Joseph Seliber, Wilmette, Ill., assignor to Pacific Lighting Service Co., Los Angeles, Calif.

Continuation of abandoned application Ser. No. 154,130, June 17, 1971. This application Apr. 3, 1974, Ser. No. 458,866

Int. Cl. B01d /04

U.S. Cl. 62—58

1 Sheet Drawing. 7 Pages Specification

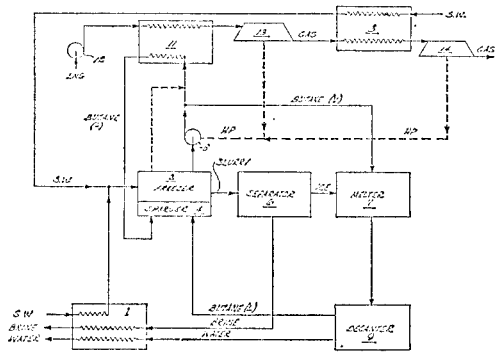

A desalination process wherein ice is formed in saline water by contact with liquid butane is described. The butane vaporized during freezing is compressed and a portion is contacted with ice separated from brine. This condenses butane and melts the ice for recovering fresh water. The liquid butane is decanted and recycled. Another portion of the butane vapor is brought in heat exchange relation with liquefied natural gas for condensing butane and vaporizing natural gas. The natural gas is expanded through a turbine to produce shaft horsepower for driving the butane compressor. The refrigeration potential and kinetic energy of expansion of the liquefied natural gas are thereby employed for desalination. The temperature in the condensing step is maintained sufficiently below the temperature in the freezing step such that the refrigerant vapor flows from the freezing step to the condensing step without compressing. The apparatus includes means for passing refrigerant vapor directly from the freezer to the condensing means.

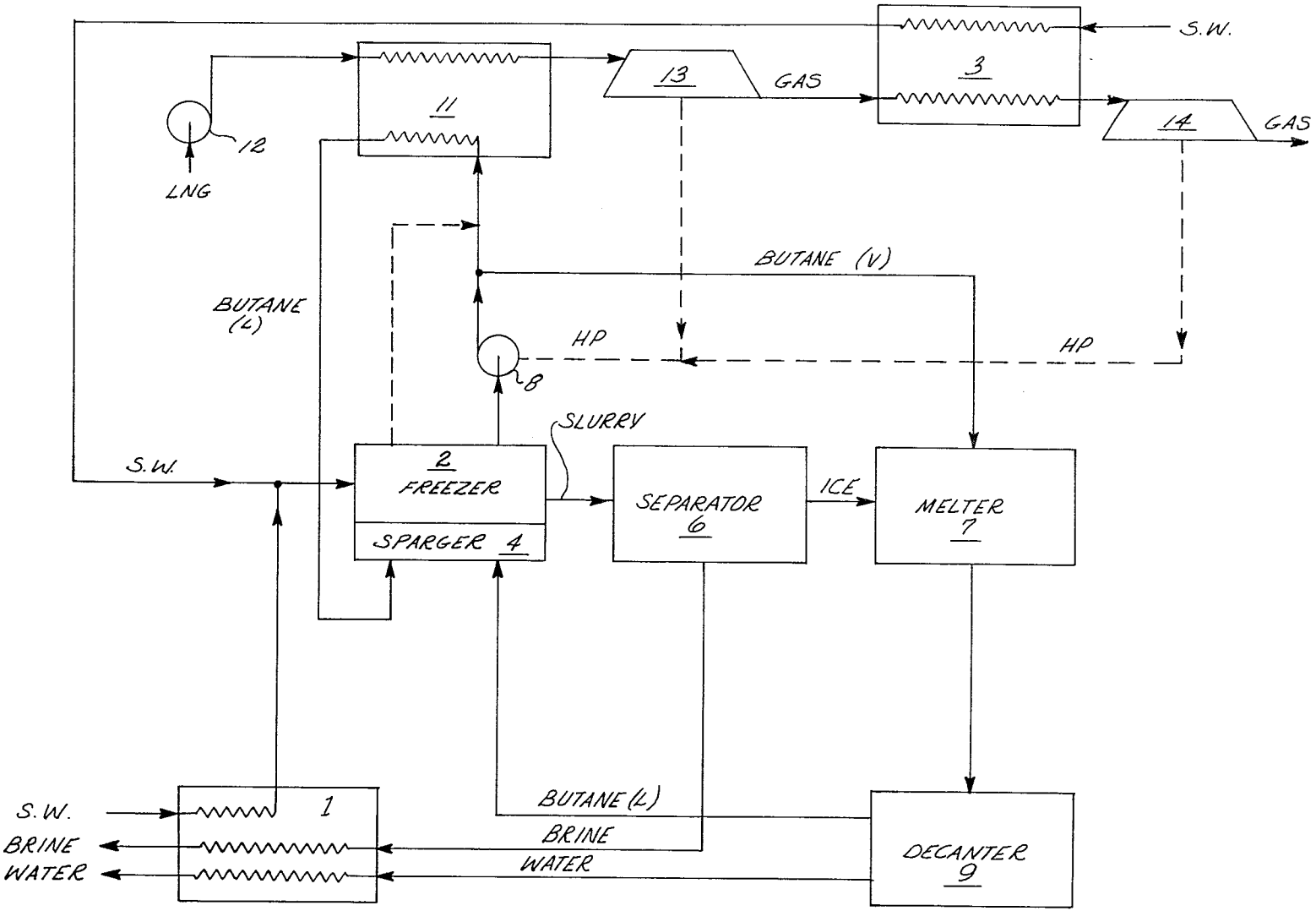

DESALINATION EMPLOYING LIQUEFIED NATURAL GAS AND SECONDARY REFRIGERANT
Filed April 8, 1974